(12) United States Patent
Banner (10) Patent No.: US 8,724,905 B2
(45) Date of Patent: May 13, 2014

(54) DETERMINING A VISUAL BALANCE OF AN IMAGE (75) Inventor: Ron Banner, Haifa (IL)

(73) Assignee: Hewlett-Packard Development Company, L.P., Houston, TX (US)

( * ) Notice: Subject to any disclaimer, the term of this patent is extended or adjusted under 35 U.S.C. 154(b) by 149 days.

(21) Appl. No.: 13/387,045

(22) PCT Filed: Nov. 20, 2009

(86) PCT No.: PCT/US2009/065294
§ 371 (c)(1),
(2), (4) Date: Jan. 25, 2012

(87) PCT Pub. No.: WO2011/062586
PCT Pub. Date: May 26, 2011

(65) Prior Publication Data
US 2012/0134594 A1 May 31, 2012

(51) Int. Cl.
G06K 9/46 (2006.01)
(52) U.S. Cl.
USPC .......................................................... 382/195
(58) Field of Classification Search
None
See application file for complete search history.

(56) References Cited

U.S. PATENT DOCUMENTS

| 5,978,506 A | 11/1999 | Murayama |
| 6,097,833 A | 8/2000 | Lobregt |
| 6,545,265 B1 | 4/2003 | Czarnetzki |
| 6,573,932 B1 | 6/2003 | Adams |
| 2005/0071755 A1 | 3/2005 | Harrington |
| 2006/0110062 A1* | 5/2006 | Chiang et al. ................. 382/260 |
| 2006/0200759 A1* | 9/2006 | Agrawala et al. ............. 715/517 |
| 2007/0133842 A1* | 6/2007 | Harrington .................... 382/112 |
| 2009/0024580 A1* | 1/2009 | Obrador .......................... 707/3 |

OTHER PUBLICATIONS

Evaluation of Visual Balance for Automated Layout. Simon Lok, Stever Feiner, and Gary Ngai. Jan. 2004.*
Alexander Christopher & Susan Carey, "Subsymmetries, Perception and Psychophysics", 1968, pp. 73-77, vol. 4 (2).
Julian Hochberg & Edward McAlister, "A quantitative approach to figural 'goodness'", Journal of Experimental Psychology, 1953, pp. 361-364, vol. 46, No. 5.
Simon Lok, et al.; "Evaluation of Visual Balance for Automated Layout"; Jan. 13-16, 2004; International Conference on Intelligent User Interfaces; ACM; Portugal, Spain.

* cited by examiner

Primary Examiner — Nirav G Patel
Assistant Examiner — Delomia Gilliard (57) ABSTRACT

A method for determining with a physical image processing device a visual balance of an image includes assigning a visual weight point to each of a plurality of visual elements within the image with the image processing device, each visual weight point having a weight value based on visual properties associated with the visual element, and determining the visual balance of the image with the image processing device by measuring a vector value at a center of the composition, the vector value being based on a distance of each visual weight point from the center and the weight value associated with each visual weight point.

18 Claims, 7 Drawing Sheets

Visual
Element Size
(400)

*Fig. 4A*

Visual
Element Shape
(406)

Visual Element
Position
Relative to Center
(518)

Fig. 5C

Visual
Element Isolation
(600)

DETERMINING A VISUAL BALANCE OF AN IMAGE

BACKGROUND

The placement or arrangement of individual visual elements within an image is often called the composition of the image. An image is said to have good composition when its component visual elements are arranged in a manner that is aesthetically pleasant to the eye. By the same token, an image having individual visual elements arranged in a manner that is unpleasant is considered to have poor composition.

Because the quality of composition tends to be a subjective characteristic, and due to the unique nature of most images, it is difficult to find universal constants that define good composition. However, some observations have been made of what generally constitutes an image with good composition. Particularly, it has been found that most images said to have good composition have a good visual balance in the spatial distribution of the various visual elements making up the image.

BRIEF DESCRIPTION OF THE DRAWINGS

The accompanying drawings illustrate various embodiments of the principles described herein and are a part of the specification. The illustrated embodiments are merely examples and do not limit the scope of the claims.

Throughout the drawings, identical reference numbers designate similar, but not necessarily identical, elements.

DETAILED DESCRIPTION

As described above, visual balance is often a key component in obtaining good image composition. The balance of an image may be affected by the various visual elements included in the image. In general, each of the visual elements within an image may be perceived as having a visual weight. The visual weight associated with each visual element may affect the overall composition of the image. The visual weight of a visual element may be affected by several factors including, but not limited to, the size, the shape, the color, the position, and the degree of isolation of the visual element.

In light of the above mentioned considerations, the present specification relates to a method for determining and adjusting the balance of visual elements in an image. According to one illustrative embodiment, the composition of an image may be modeled using a vector field, similar to those used to model various physical phenomenal such as electric fields or gravitational fields.

To use a vector field to model visual balance of an image, each visual element within the image may be associated with at least one visual weight point. The visual weight point may have a value based on the factors mentioned above. In one embodiment, visual weight points may be assigned along the border as well. A given point within the image may be assigned a vector value. The vector value may be determined by the sum of the "forces" experienced by each visual weight point. The force experienced by a point from a given visual weight point may be based on such factors as the distance to, direction of, and weight value of the visual weight point. An image may be said to be balanced when the center point has a vector value of zero. Having a vector value of zero indicates that all experienced forces are cancelled out by equal and opposite forces.

A computing device embodying principles described herein may allow a user to determine the visual balance of an image. A user may determine the balance of several types of images including, but not limited to, photographic images, non-photographic images, and graphic designs. In addition, a user may be provided with tools which will aid the creation of a visually balanced composition of a piece of art.

In the following description, for purposes of explanation, numerous specific details are set forth in order to provide a thorough understanding of the present systems and methods. It will be apparent, however, to one skilled in the art that the present apparatus, systems and methods may be practiced without these specific details. Reference in the specification to "an embodiment," "an example" or similar language means that a particular feature, structure, or characteristic described in connection with the embodiment or example is included in at least that one embodiment, but not necessarily in other embodiments. The various instances of the phrase "in one embodiment" or similar phrases in various places in the specification are not necessarily all referring to the same embodiment.

Figure 1:
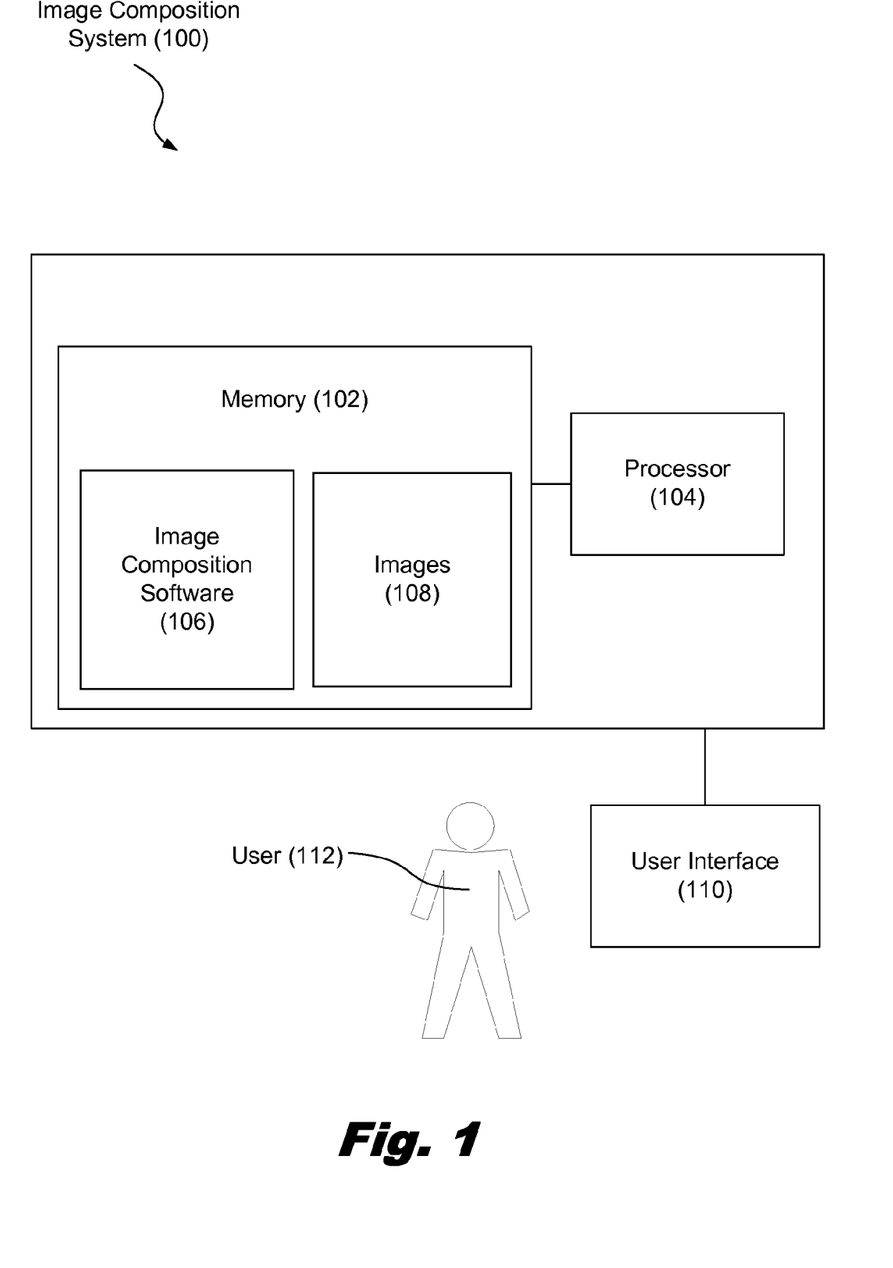
FIG. 1 is a diagram showing an illustrative image system, according to one embodiment of principles described herein.

Referring now to the figures, FIG. 1 is a diagram showing an illustrative image composition system (100). According to one illustrative embodiment, an image composition system may include a processor (104), a user interface (110), and a memory (102) having image composition software (106) and a number of images (108) stored thereon.

The image composition system (100) may be embodied as any available computing device including, but not limited to, a laptop computer, a desktop computer, a server, and a Personal Digital Assistant (PDA). The image composition system (100) may include a form of memory (102) including, but not limited to, a magnetic disk drive, a solid state drive, and/or an optical disc drive.

The image composition software (106) stored by the memory (102) may be embodied as computer readable code configured to cause a processor (104) to execute various instructions related to the processing of image composition balancing.

An image (108) may be any type of image including, but not limited to, a photograph, a non-photographic image, or a graphic design. A collection of images (108) may include images imported from another memory medium as well as images designed and/or created with the image composition system (100).

The user interface (110) may enable interaction between the image composition system (100) and a user (112). The user interface (110) may include a display device as well as an input receiving device such as a keyboard or a mouse. Through the user interface (110), a user (112) is able to send commands to the image composition system (100). These commands may involve the adjustment of image compositions (108). Information about images (108) and their composition may be presented to the user (112) through the display device.

Figure 2:
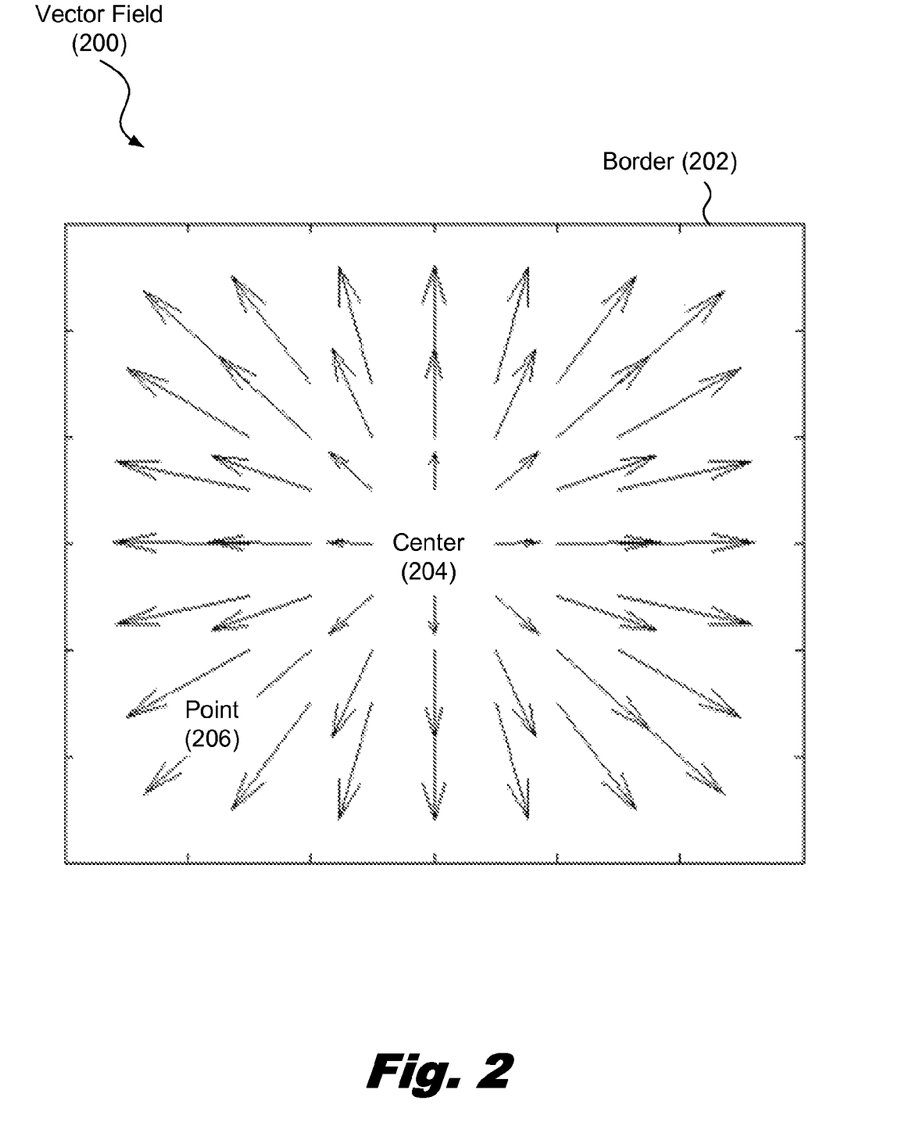
FIG. 2 is a diagram showing an illustrative vector field which may be used to model the composition of an image, according to one embodiment of principles described herein.

FIG. 2 is a diagram showing an illustrative vector field (200) which may be used to model the composition of an image. According to certain illustrative embodiments, a weight value may be given to the borders (202) around a vector field (200). A vector value may then be calculated at each point (206) within the vector field (200) as a function of the weight of and distance to every weight point assigned along the borders (202) of the vector field (200).

In certain embodiments, the calculated vector value at any point within the vector field may be calculated using the following equation:

$$V = \sum_{n=1}^{m} \frac{Q_n}{r_n^2} R_n \quad \text{Equation (1)}$$

Where:
V=the vector value;
n=an index value used to index each visual weight point;
m=a total number of the visual weight points in the image;
$Q_n$=a visual weight value of an indexed visual weight point;
$r_n$=a distance to the indexed visual weight point from the center; and
$R_n$=a unit vector in a direction pointing from the point being calculated to the indexed visual weight point.

As will be appreciated by those skilled in the relevant art, Equation 1 represents the sum of all vectors determined by distance to and weight of every weight point within the vector field. A similar equation is used to calculate the forces on various objects in both gravitational and electric fields. Due to the inverse square characteristic of Equation 1, the effect a weight point has on a given calculated point increases exponentially as the weight point becomes closer to the calculated point. As can be seen in FIG. 2, the arrows representing vector values are larger for points closer to the border than points farther away from the borders. With an equal weight point distribution across the borders, the center (204) of the vector field will have a vector value of zero. This is because at the center, every vector value is cancelled out by an equal and opposite vector value.

In certain embodiments, the weight value assigned to each border may be represented as a continuous weight value spread across the border. In the present example, to calculate the total effect at any given point from each border, an integral equation may be used instead of the summation equation shown in Equation 1.

As demonstrated above, weight points may be assigned to visual elements within an image. The weight value assigned to each weight point may depend on several characteristics of the visual element associated with a weight point. The placement of weight points within the image may have an effect on the vector values calculated at various points throughout the vector field.

As further demonstrated above, in order to determine a visual balance of an image, the vector value at the center of the image may be measured. An image is more visually balanced as the vector value at the center of the vector field modeling the composition of the image is closer to zero. Visual elements within the image which have been assigned weight points will have an effect on the vector value measured at the center of the image.

Figure 3A:
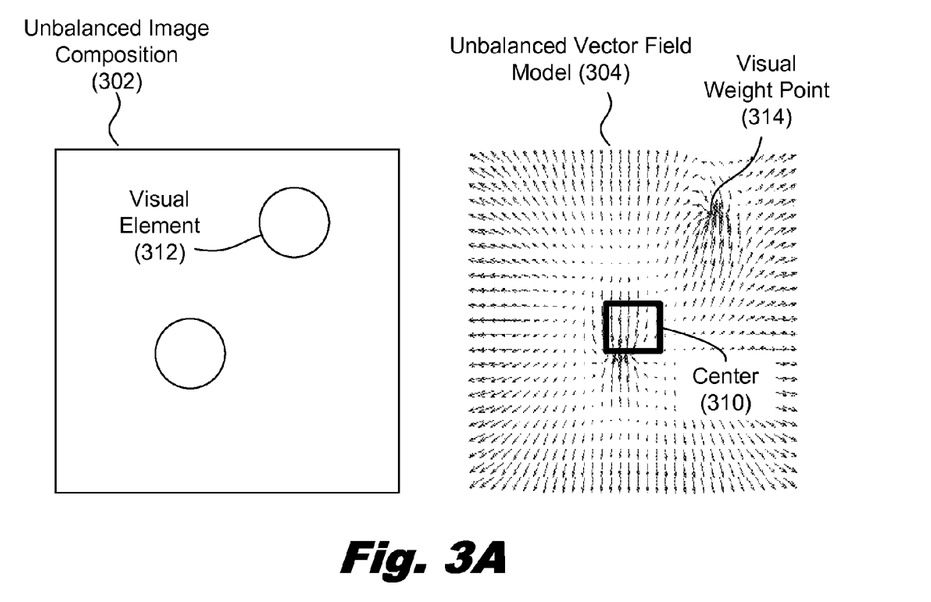
FIG. 3A is a diagram showing an illustrative unbalanced image and its accompanying vector field model, according to one embodiment of principles described herein.
Figure 3B:
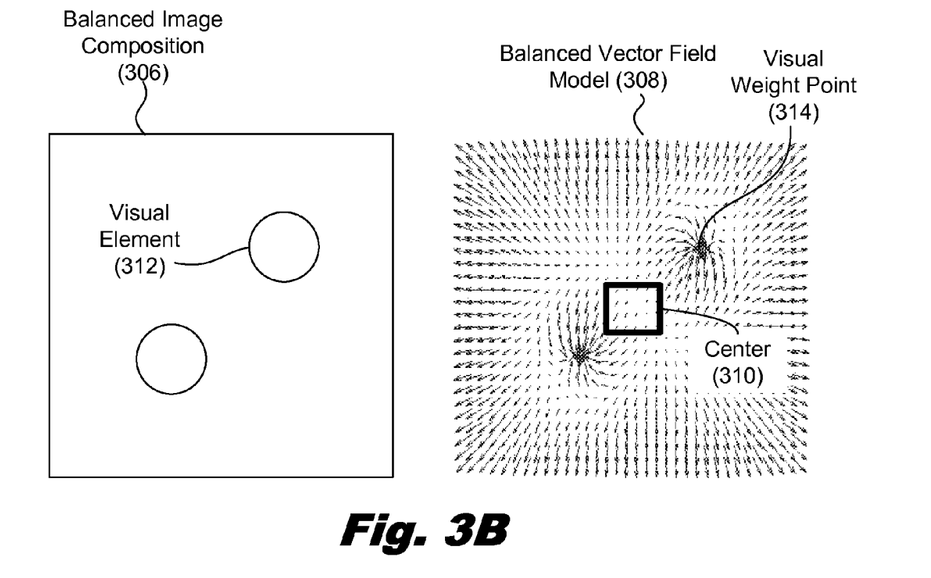
FIG. 3B is a diagram showing an illustrative balanced image and its accompanying vector field model, according to one embodiment of principles described herein.

FIGS. 3A and 3B respectively illustrate two examples of how visual elements placed within an image may affect the balance of the composition. In the example shown in FIGS. 3A and 3B, a vector field model includes weight points at locations that correspond to the location of visual elements within the image.

FIG. 3A is a diagram showing an illustrative unbalanced image composition (302) and its accompanying vector field model (304). Within the unbalanced image composition (302), two visual elements (312) are placed such that the their corresponding weight points cause the vector value at the center (310) of the vector field model (304) to be not equal and not close to zero. As can be seen from the unbalanced vector field model (304) in FIG. 3A, the locations of the visual weight points (314) affect the nearby vector values, most importantly, the vector value at the center (310) of the vector field (304).

FIG. 3B is a diagram showing an illustrative balanced image and its accompanying vector field model (308). Within the balanced image composition (306), two visual elements (312) are placed such that their corresponding visual weight points cause the vector value at the center (310) of the balanced vector field model (308) to be equal to or close to zero. Again, as can be seen from the balanced vector field model (308) in FIG. 3B, the locations of the visual weight points (314) affect the nearby vector values, including the vector value at the center (310) of the vector field (308).

Figure 4A:
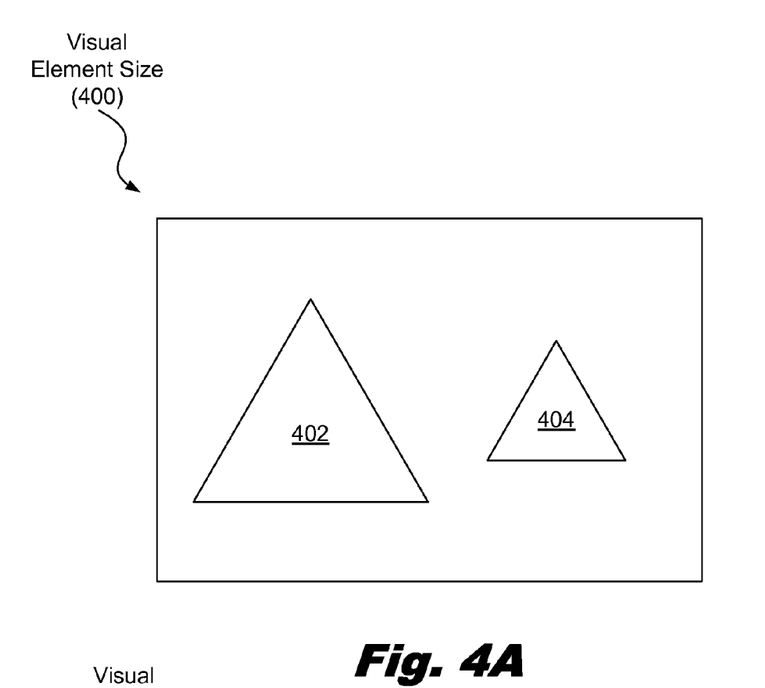
FIG. 4A is a diagram of an illustrative relationship between the size of a visual element and the visual weight associated with the visual element, according to one embodiment of principles described herein.
Figure 4B:
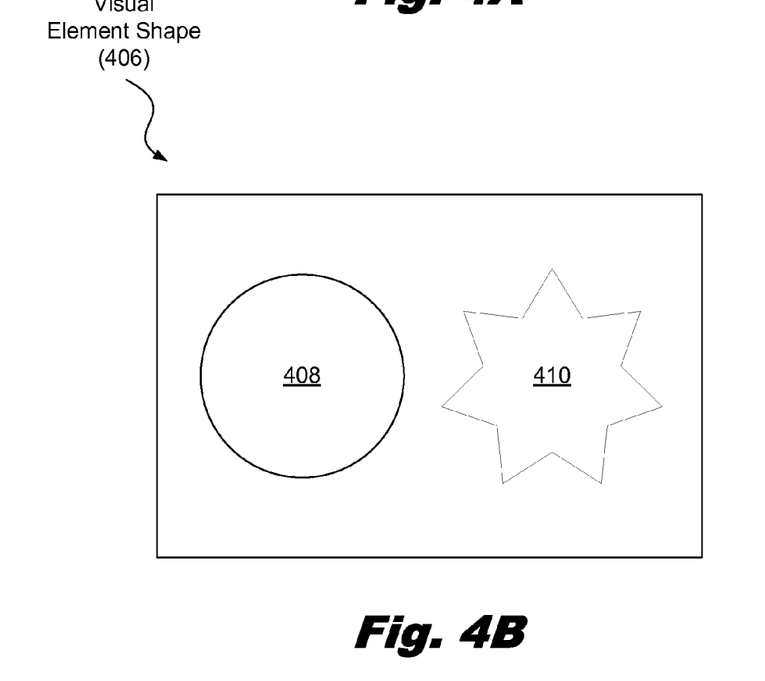
FIG. 4B is a diagram of an illustrative relationship between the shape of a visual element and the visual weight associated with the visual element, according to one embodiment of principles described herein.

As mentioned above, the visual weight assigned to each visual weight point associated with a visual element may depend on a variety of characteristics associated with that visual element. The ways in which the varieties of characteristics influence their visual weight are based on psychological studies of how these characteristics affect the visual weight of a visual element. FIG. 4 illustrates how the size or shape of an object may affect the visual weight associated with a visual element.

FIG. 4A is a diagram illustrating how visual element size (400) may affect the visual weight of a visual element. It is perceived that the visual weight of a visual element may be affected by its size. For example, the visual weight point associated with the triangle (402) on the left may be given a weight value greater than the visual weight value assigned to the visual weight point associated with the triangle (404) on the right. If the triangle (402) on the left were to be replaced with a similarly sized triangle as the triangle (404) on the right, then the visual weight point associated with each triangle may be given a similar visual weight, assuming no other factors such as position are affecting the visual weight.

A given weight value for a weight point assigned to a visual element may have a final value which has factored in several characteristics of the assigned visual element. In some cases, a visual element may have greater size than a similar visual element and yet have a smaller weight value given to its assigned visual weight point. This may be due to other factors influencing the final value of the visual weight points.

FIG. 4B is a diagram illustrating how visual element shape (406) may affect the visual weight of a visual element. It is perceived that the visual weight of a visual element is greater for simpler shapes than for more complex shapes. For example, the circle element (408) may carry more visual weight than the star element (410), all other factors being equal. Thus, the visual weight point of the circle element (408) may have a greater value factored into its final visual weight value.

It is perceived that the color of a visual element may affect its visual weight. For example, brighter colors tend to carry more visual weight than less brighter colors. In addition, red colors tend to carry more visual weight than blue colors.

Figure 5A:
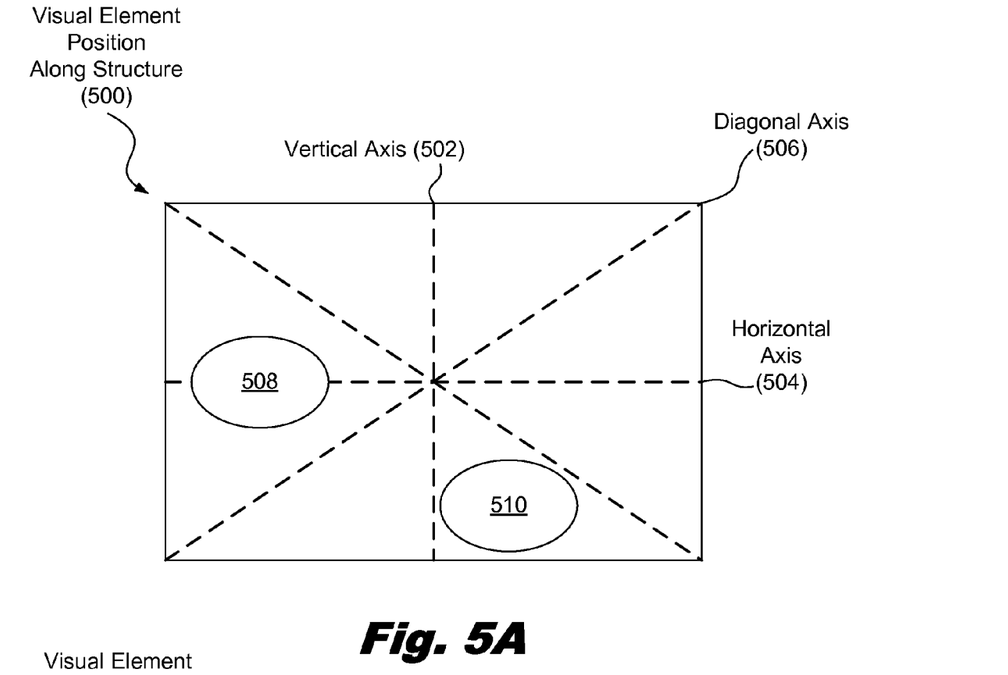
FIGS. 5A-5C are diagrams of an illustrative relationship between the position of a visual element within a particular image and the visual weight of the visual element, according to one embodiment of principles described herein.
Figure 5B:
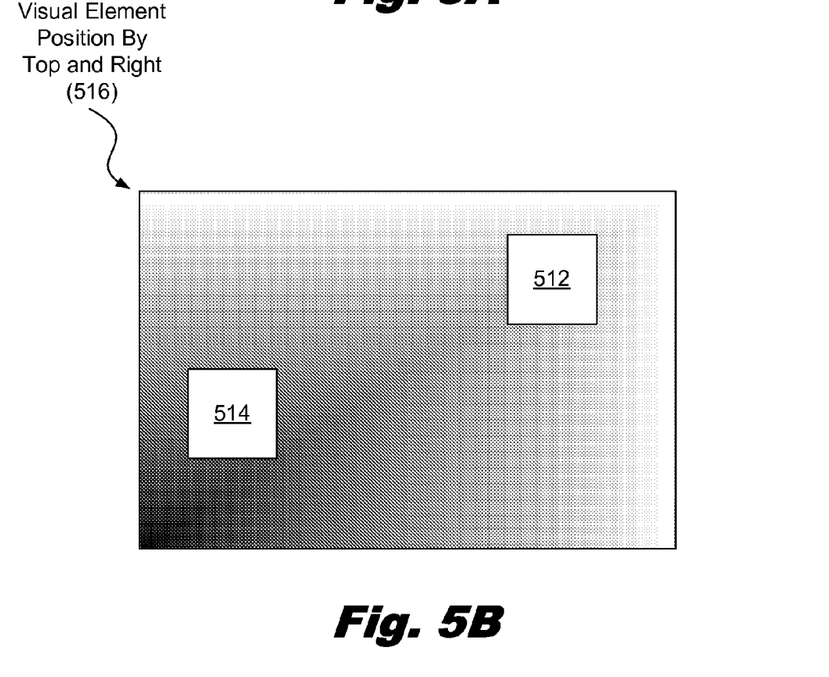
Figure 5C:
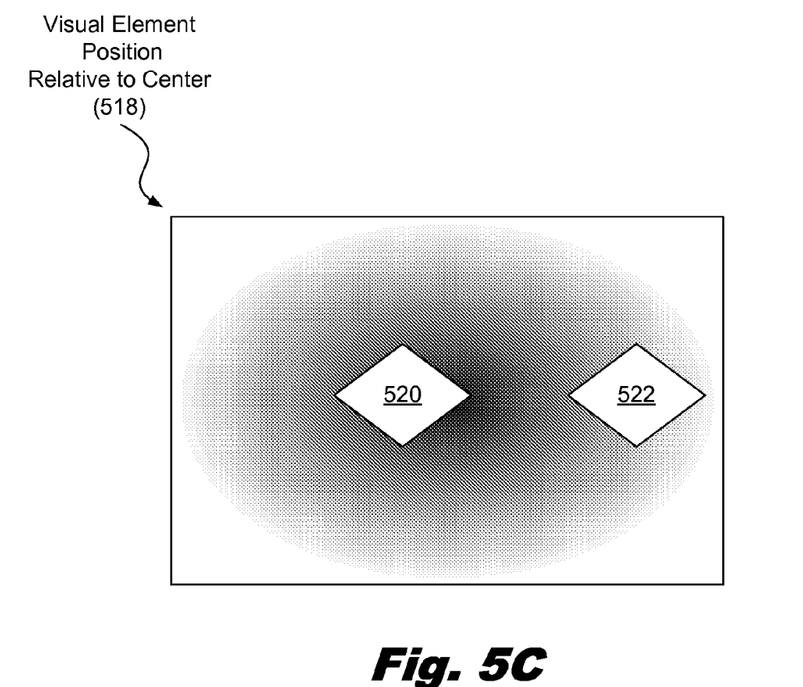

FIGS. 5A-5C are diagrams illustrating how visual element position may affect the visual weight of a visual element. It is perceived that the position of a visual element has an effect on its visual weight.

FIG. 5A is a diagram illustrating how the placement of a visual element relative to a skeletal structure (500) of a image may its visual weight. Visual elements tend to have more visual weight when placed closer to the vertical axis (502), the horizontal axis (504), or a diagonal axis (506). For example, the oval element (508) in the middle left of the image may have more visual weight than the oval element (510) in the lower right of the image. Thus, the visual weight point assigned to the oval element (508) in the middle left may have a greater value factored in to its final visual weight value.

FIG. 5B is a diagram illustrating how the visual weight of a visual element may be affected by its position relative to a top and right (516) of an image composition. It has been demonstrated that a visual element holds more visual weight when it is placed towards the top of an image. Likewise, it has been demonstrated that a visual element tends to hold more weight as it is placed towards the right side of an image composition. For example, the square element (512) on the right side of the image may hold more visual weight than the square element (514) on the left side of the image. Thus the visual weight point assigned to the square element (512) on the right side of the image may have a greater value factored into its final visual weight value.

FIG. 5C is a diagram illustrating how the visual weight of visual element may be affected by its position relative to the center of an image composition. It has been demonstrated that a visual element may carry more visual weight when it is placed further from the center of an image. For example, the diamond element (522) on the right side of the image may have greater visual weight factored in than the diamond element (520) towards the center of the image. Thus, the visual weight point of the diamond element (522) on the right side of the image may have a greater value factored into its final visual weight value.

Figure 6:
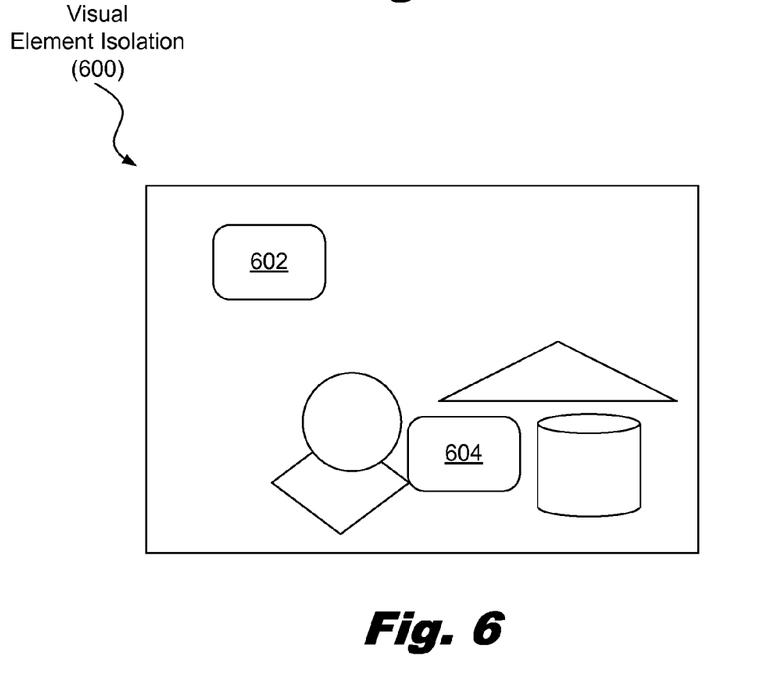
FIG. 6 is a diagram of an illustrative relationship between the degree of isolation associated with a visual element within a particular image and the visual weight of the visual element, according to one embodiment of principles described herein.

FIG. 6 is a diagram illustrating how the visual weight of a visual element may be affected by its isolation. It has been demonstrated that visual elements in isolation of other visual elements tend to carry more weight than those close to other visual elements. For example, the rounded square element (602) in the top left of the image may have a greater weight value factored in due to its isolation from other visual elements than the rounded square element (604) at the bottom right of the image. Thus the visual weight point assigned to the rounded square element (602) at the top of the image may have a greater value factored into its final visual weight value.

The characteristics of visual elements mentioned above may be combined to determine a final weight value of a given weight point assigned to a visual element. In one embodiment, a visual element may be assigned one visual weight point at the center of the visual element. In one embodiment, a given visual element may be assigned multiple visual weight points, each weight point within the visual element having a weight value which further depends on its position within the visual element.

Figure 7:
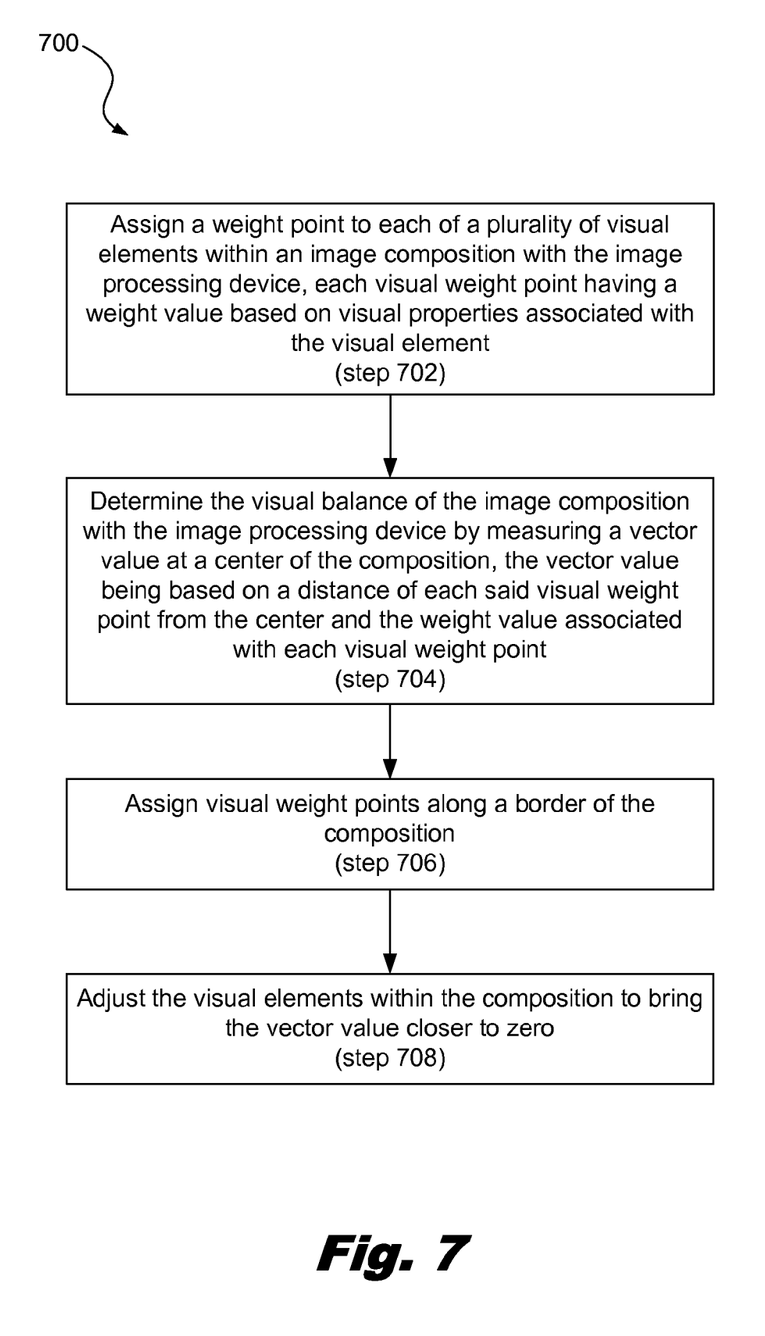
FIG. 7 is a flowchart showing an illustrative method for determining the balance of a given image, according to one embodiment of principles described herein.

FIG. 7 is a flowchart showing an illustrative method (700) for determining the balance of a given image, and thus providing a better composition for the image. According to one illustrative embodiment, the method (700) may include assigning (step 702) a weight point to each of a plurality of visual elements within the image with the image processing device, each visual weight point having a weight value based on visual properties associated with the visual element, and determining step (step 704) the visual balance of the image with the image processing device by measuring a vector value at a center of the image, the vector value being based on a distance of each visual weight point from the center and the weight value associated with each visual weight point. The method may further include assigning (step 706) a visual weight point along a border of the image. Additionally, the method may include adjusting (step 708) the visual elements within the image to bring the vector value closer to zero.

In sum, an image is balanced when the visual weight of the visual elements within the image are balanced around the center of the image. The balance of an image composition may be modeled with a vector field. Each visual element may be assigned a visual weight point which has a visual weight value. The visual weight value of a visual weight point may be influenced by characteristics associated with the visual element associated with that visual weight point. These characteristics may include, but are not limited to, size, shape, color, position, and isolation of the visual element. An image composition may said to be more balanced as the vector value at the center of the image is closer to zero. The vector value for the center of the image composition may be calculated by an equation taking into account such factors as the distance to, direction of, and weight of each visual weight point within the vector field modeling the image composition.

An image composition system embodying principles described herein may allow a user to adjust images in order to bring them into balance. Additionally, balanced images may be created automatically.

The preceding description has been presented only to illustrate and describe embodiments and examples of the principles described. This description is not intended to be exhaustive or to limit these principles to any precise form disclosed. Many modifications and variations are possible in light of the above teaching.

What is claimed is:

1. A method for determining with a physical image processing device a visual balance of an image, said method comprising:
assigning a visual weight point to each of a plurality of visual elements within said image with said image processing device, each said visual weight point having a weight value based on visual properties associated with said visual element; and
determining said visual balance of said image with said image processing device by measuring a vector value at a center of said image, said vector value being based on a distance of each said visual weight point from said center and said weight value associated with each said visual weight point;
in which the vector value is calculated by summing all of a number of vectors determined by each vector's distance to and weight of every weight point within a vector field.

2. The method of claim 1, further comprising, assigning a visual weight point along a border of said image.

3. The method of claim 1, in which said vector value is determined by an equation as follows:

$$V = \sum_{n=1}^{m} \frac{Q_n}{r_n^2} R_n$$

in which V is said vector value, n indexes each said visual weight point, m is a total number of said visual weight points in said image, $Q_n$ is a visual weight value of an indexed visual weight point, $r_n$ is a distance to said indexed visual weight point from said center, and $R_n$ is a unit vector in a direction pointing from said center to said indexed visual weight point.

4. The method of claim 1, in which said visual weight value of a said visual weight point is based on at least one of: a size of said visual element associated with said visual weight point, a shape of said visual element associated with said visual weight point, and a color of said visual element associated with said visual weight point.

5. The method of claim 1, in which said visual weight value of a said visual weight point increases according to a proximity of said visual weight point to at least one of: a horizontal axis of said image, a vertical axis of said image, and a diagonal axis of said image.

6. The method of claim 1, in which said visual weight value of a said visual weight point increases according to a proximity of said visual weight point to at least one of: a top of said image and a right side of said image.

7. The method of claim 1, in which said visual weight value a said visual weight point decreases according to a proximity of said visual weight point to said center of said composition.

8. The method of claim 1, in which said visual weight value of a said visual weight point increases proportional to an increase in a degree of isolation of said visual weight point from other said visual weight points in said image.

9. The method of claim 1, in which said visual weight value of a said visual weight points is at least partially dependent on a said visual weight value of another said visual weight point within said image.

10. The method of claim 1, further comprising adjusting said visual elements within said composition to bring said vector value closer to zero.

11. A computing system comprising:
a processor; and
a memory communicatively coupled to said processor;
in which said processor is configured to:
assign a visual weight point to each of a plurality of visual elements within said image with said image processing device, each said visual weight point having a weight value based on visual properties associated with said visual element; and
determine said visual balance of said image with said image processing device by measuring a vector value at a center of said composition, said vector value being based on a distance of each said visual weight point from said center and said weight value associated with each said visual weight point;
in which said vector value at a point is determined by an equation as follows:

$$V = \sum_{n=1}^{m} \frac{Q_n}{r_n^2} R_n$$

in which V is said vector value, n indexes each said visual weight point, m is a total number of said visual weight points in said image, $Q_n$ is a visual weight value of an indexed visual weight point, $r_n$ is a distance to said indexed visual weight point from said center, and $R_n$ is a unit vector in a direction pointing from said center to said indexed visual weight point.

12. The computing system of claim 11, in which said processor is further configured to assign a visual weight point along a border of said composition.

13. The computing system of claim 11, in which said processor is further configured to adjust said visual elements within said composition to bring said vector value closer to zero.

14. A computer program product for determining a balance of an image, said computer program product comprising:
a non-transitory computer readable storage medium having computer readable code embodied therewith, said computer readable program code comprising:
computer readable program code configured to:
assign a visual weight point to each of a plurality of visual elements within said image with said image processing device, each said visual weight point having a weight value based on visual properties associated with said visual element; and
determine said visual balance of said image with said image processing device by measuring a vector value at a center of said composition, said vector value being based on a distance of each said visual weight point from said center and said weight value associated with each said visual weight point;
in which said visual weight value of a said visual weight point increases according to a proximity of said visual weight point to and axis of said image.

15. The computer program product of claim 14, in which said vector value is determined by an equation as follows:

$$V = \sum_{n=1}^{m} \frac{Q_n}{r_n^2} R_n$$

in which V is said vector value, n indexes each said visual weight point, m is a total number of said visual weight points in said image, $Q_n$ is a visual weight value of an indexed visual weight point, $r_n$ is a distance to said indexed visual weight point from said center, and $R_n$ is a unit vector in a direction pointing from said center to said indexed visual weight point.

16. The computing system of claim 11, in which the vector value is calculated by summing all vectors based on distance to and weight of every weight point within a vector field comprising all vectors.

17. The computing system of claim 11, in which said visual weight value of a said visual weight points is at least partially dependent on a said visual weight value of another said visual weight point within said image.

18. The computing system of claim 11, in which said weight value of a said visual weight point increases proportional to an increase in a degree of isolation of said visual weight point from other said visual weight points in said image.

* * * * *

UNITED STATES PATENT AND TRADEMARK OFFICE
CERTIFICATE OF CORRECTION

PATENT NO. : 8,724,905 B2  Page 1 of 1
APPLICATION NO. : 13/387045
DATED : May 13, 2014
INVENTOR(S) : Ron Banner It is certified that error appears in the above-identified patent and that said Letters Patent is hereby corrected as shown below:

In the Specification

In column 1, line 3, below "IMAGE"
insert -- RELATED APPLICATIONS
This application claims priority under 35 U.S.C. 371 to PCT/US2009/065294, entitled "Determining a Visual Balance of an Image", filed on Nov. 20, 2009, commonly assigned herewith, and hereby incorporated by reference. --.

Signed and Sealed this
Nineteenth Day of August, 2014

Michelle K. Lee
*Deputy Director of the United States Patent and Trademark Office*